United States Patent
Chen et al.

(10) Patent No.: US 8,963,879 B2
(45) Date of Patent: Feb. 24, 2015

(54) POSITIONING METHOD FOR TOUCH DISPLAY PANEL

(75) Inventors: Wei-Hao Chen, Hsinchu (TW); Chin-Yi Lin, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 229 days.

(21) Appl. No.: 13/615,643

(22) Filed: Sep. 14, 2012

(65) Prior Publication Data
US 2014/0009433 A1    Jan. 9, 2014

(30) Foreign Application Priority Data
Jul. 3, 2012 (TW) .............................. 101123900 A (51) Int. Cl.
*G06F 3/044* (2006.01)
*G06F 3/041* (2006.01)

(52) U.S. Cl.
CPC ............... *G06F 3/044* (2013.01); *G06F 3/0414* (2013.01)
USPC ....................................................... 345/174

(58) Field of Classification Search
CPC .......... G06F 3/044; G06F 2203/04103; G06F 3/0414
USPC ........................................ 345/174; 178/18.06
See application file for complete search history.

(56) References Cited

U.S. PATENT DOCUMENTS

| | | | | |
|---|---|---|---|---|
| 7,511,702 | B2 * | 3/2009 | Hotelling | 345/174 |
| 2008/0018611 | A1 * | 1/2008 | Serban et al. | 345/173 |
| 2011/0057899 | A1 * | 3/2011 | Sleeman et al. | 345/174 |
| 2012/0055257 | A1 * | 3/2012 | Shaw-Klein | 73/780 |
| 2013/0016060 | A1 * | 1/2013 | Pereverzev et al. | 345/174 |

* cited by examiner

*Primary Examiner* — Allison Johnson
(74) *Attorney, Agent, or Firm* — Jianq Chyun IP Office (57) ABSTRACT

A positioning method for a touch display panel is provided. The touch display panel includes a touch panel and a display panel. The display panel is disposed on the touch panel, and sensing points and reference positions are set on the touch panel. In the method, pressures with different values are repeatedly applied to each reference position; under the pressures with the different values, average capacitance values of the reference positions corresponding to the sensing points are calculated. When an object touches the display panel, the sensing points of the touch panel correspondingly generate second capacitance values. Under a touch pressure value, the average capacitance values of the reference positions corresponding to the sensing points are selected. The second capacitance values and the average capacitance values of the reference positions corresponding to the sensing points under the touch pressure value are used to calculate a touch position of the object.

9 Claims, 4 Drawing Sheets

POSITIONING METHOD FOR TOUCH DISPLAY PANEL

CROSS-REFERENCE TO RELATED APPLICATION

This application claims the priority benefit of Taiwan application serial no. 101123900, filed on Jul. 3, 2012. The entirety of the above-mentioned patent application is hereby incorporated by reference herein and made a part of this specification.

BACKGROUND OF THE INVENTION

1. Field of Invention

The invention relates to a positioning method, and more particularly, to a positioning method for a touch display panel.

2. Background of the Invention

With the advancement of the electronic technology and the display technology, great breakthroughs have been brought to the existing human-machine interfaces that are no longer limited to mice or operating keyboards. Most electronic devices, such as notebook computers, mobile phones, or portable multimedia players, have touch panels serving as innovative input interfaces in replacement of conventional keyboards.

Based on the principle of designing touch display panels in different touch sensing modes, the touch display panels may be categorized into resistive touch display panels, capacitive touch display panels, optical touch display panels, sound wave touch display panels, electromagnetic touch display panels, and so on. Here, the resistive touch display panels and the capacitive touch display panels are the mainstream products. From another aspect, the touch display panels may be categorized into an adhesive type and a built-in type according to the structure of the touch display panels. In a capacitive touch panel, a uniform low-voltage electric field is generated between an inner conductive layer and an outer conductive layer. When a conductor (e.g., a user's finger) touches the panel, the resultant electrostatic binding may lead to a slight variation of capacitance. Through measurement of a position of the variation of capacitance of the panel, the coordinates of the touch position on the panel may be determined.

A conventional capacitive touch display panel is constituted by a touch panel and an underlying display panel. The touch panel is disposed above the display panel, and therefore transmittance of the display panel is apt to be reduced. If the display panel is disposed in front of the touch panel to improve the transmittance of the display panel, a touch signal can only be transmitted to the touch panel through the display panel, and thus the positioning accuracy is not as favorable as expected. Therefore, how to enhance the positioning accuracy of the capacitive touch display panel is one of the issues to be dealt with instantly in the field of the capacitive touch display panel.

SUMMARY OF THE INVENTION

The invention is directed to a positioning method for a touch display panel. Through applying the positioning method, favorable positioning accuracy may be ensured.

In an embodiment of the invention, a positioning method for a touch display panel is provided. The touch display panel includes a touch panel and a display panel. The display panel is disposed on the touch panel, and the touch panel has a plurality of sensing points and a plurality of reference positions thereon. The reference positions are defined by a plurality of x-axes and a plurality of y-axes collectively, the x-axes and the y-axes are alternately arranged in a matrix manner. The sensing points are distributed on the reference positions. The positioning method for the touch display panel includes following steps. Pressures with different values are repeatedly applied to each of the reference positions; a plurality of first capacitance values generated by the sensing points under the pressures with the different values are detected; a calculation operation is performed on the first capacitance values respectively corresponding to the reference positions under the same pressure value; a plurality of average capacitance values of the reference positions corresponding to the sensing points under the pressures with the different values are calculated. When an object touches the display panel, a plurality of second capacitance values are correspondingly generated by the sensing points of the touch panel. The second capacitance values are compared with the average capacitance values under the pressures with the different values, and the average capacitance values of the reference positions corresponding to the sensing points under a touch pressure value of the pressures with the different values are selected. The second capacitance values and the average capacitance values of the reference positions corresponding to the sensing points under the touch pressure value are used to calculate a touch position of the object.

According to an embodiment of the invention, the step of comparing the second capacitance values with the average capacitance values under the pressures with the different values includes the following. The average capacitance values of the reference positions in a first target region around one of the sensing points having a maximum second capacitance value of the second capacitance values are selected. The second capacitance values of the touch position and the average capacitance values of the reference positions in the first target region under the pressures with the different values are used to at least calculate a third capacitance value and a fourth capacitance value respectively corresponding to two of the pressures with the different values. A minimum value is selected from the third and fourth capacitance values to obtain the average capacitance values of the reference positions corresponding to the sensing points under the touch pressure value.

According to an embodiment of the invention, the positioning method for the touch display panel further includes following steps. After the average capacitance values of the reference positions in the first target region under the pressures with the different values are selected, the average capacitance values of the reference positions in a second target region around one of the sensing points having a second largest second capacitance value of the second capacitance values under the pressures with the different values are selected, and the second target region and the first target region are partially overlapped. A formula including parameters of the second capacitance values of the touch position and the average capacitance values of the reference positions in the second target region under the pressures with the different values is used to at least calculate a fifth capacitance value and a sixth capacitance value respectively corresponding to two of the pressures with the different values. A minimum value is selected from the third, fourth, fifth, and sixth capacitance values to obtain the average capacitance values of the reference positions corresponding to the sensing points under the touch pressure value.

According to an embodiment of the invention, the formula including the parameters of the second capacitance values of the touch position and the average capacitance values of the reference positions in the first target region or the second target region under the pressures with the different values is:

$$M1=(C_1\text{-table}\_C)^2+(C_2\text{-table}\_C_2)^2+(C_3\text{-table}\_C_3)^2+\ldots+(C_n\text{-table}\_C_n)^2,$$

$n \geq 1$, wherein n is the number of the sensing points, $C_1 \sim C_n$ are the second capacitance values of the sensing points corresponding to the reference positions, $\text{table}\_C_1 \sim \text{table}\_C_n$ are the average capacitance values of the reference positions corresponding to the sensing points, and M1 is a capacitance value corresponding to each of the pressures with the different values.

According to an embodiment of the invention, the formula including the parameters of the second capacitance values of the touch position and the average capacitance values of the reference positions in the first target region or the second target region under the pressures with the different values is:

$$M1=abs(C_1\text{-table}\_C_1)+abs(C_2\text{-table}\_C_2)+abs(C_3\text{-table}\_C_3)+\ldots+abs(C_n\text{-table}\_C_n),$$

$n \geq 1$, wherein n is the number of the sensing points, $C_1 \sim C_n$ are the second capacitance values of the sensing points corresponding to the reference positions, $\text{table}\_C_1 \sim \text{table}\_C_n$ are the average capacitance values of the reference positions corresponding to the sensing points, and M1 is a capacitance value corresponding to each of the pressures with the different values.

According to an embodiment of the invention, the step of using the second capacitance values and the average capacitance values of the reference positions corresponding to the sensing points under the touch pressure value to calculate the touch position of the object includes selecting the average capacitance values of the reference positions corresponding to the sensing points in a third target region around one of the sensing points having a maximum second capacitance value of the second capacitance values under the touch pressure value; using a formula comprising parameters of the second capacitance values of the touch position and the average capacitance values of the reference positions in the third target region under the touch pressure value to calculate at least a third capacitance value and a fourth capacitance value respectively corresponding to two different values; selecting a minimum value from the third and fourth capacitance values to obtain the touch position of the object.

According to an embodiment of the invention, the positioning method for the touch display panel further includes: after selecting the average capacitance values of the reference positions corresponding to the sensing points in the third target region under the touch pressure value, selecting the average capacitance values of the reference positions corresponding to the sensing points in a fourth target region around one of the sensing points having a second largest second capacitance value of the second capacitance values under the touch pressure value. Here, the fourth target region and the third target region are partially overlapped. Besides, a formula including parameters of the second capacitance values of the touch position and the average capacitance values of the reference positions in the fourth target region under the touch pressure value are used to at least calculate a fifth capacitance value and a sixth capacitance value respectively corresponding to two different values. A minimum value is selected from the third, fourth, fifth, and sixth capacitance values to obtain the touch position of the object.

According to an embodiment of the invention, the formula including the parameters of the second capacitance values of the touch position and the average capacitance values of the reference positions in the third target region or the fourth target region under the touch pressure value is:

$$M2=\text{sqrt}((C_1\text{-table}\_C_1)^2+(C_2\text{-table}\_C_2)^2+(C_3\text{-table}\_C_3)^2+\ldots+(C_n\text{-table}\_C_n)^2),$$

$n \geq 1$, wherein n is the number of the sensing points, $C_1 \sim C_n$ are the second capacitance values of the sensing points corresponding to the reference positions, $\text{table}\_C_1 \sim \text{table}\_C_n$ are the average capacitance values of the reference positions corresponding to the sensing points, and M2 is a capacitance value under the touch pressure value.

According to an embodiment of the invention, the formula including the parameters of the second capacitance values of the touch position and the average capacitance values of the reference positions in the third target region or the fourth target region under the touch pressure value is:

$$M2=abs(C_1\text{-table}\_C_1)+abs(C_2\text{-table}\_C_2)+abs(C_3\text{-table}\_C_3)+\ldots+abs(C_n\text{-table}\_C_n),$$

$n \geq 1$, wherein n is the number of the sensing points, $C_1 \sim C_n$ are the second capacitance values of the sensing points corresponding to the reference positions, $\text{table}\_C_1 \sim \text{table}\_C_n$ are the average capacitance values of the reference positions corresponding to the sensing points, and M2 is a capacitance value under the touch pressure value.

According to an embodiment of the invention, the positioning method for the touch display panel further includes applying different weights respectively to the third, fourth, fifth, and sixth capacitance values.

As described above, the average capacitance values of the reference positions corresponding to the sensing points under the pressures with the different values are measured in an embodiment of the invention. Therefore, when the object touches the display panel to enable the sensing points of the touch panel below the display panel to correspondingly generate the second capacitance values, the second capacitance values may be compared with the average capacitance values under the pressures with the different values, so as to obtain the average capacitance values of the reference positions corresponding to the sensing points at the time the object touches the display panel to generate a touch pressure value. Thereafter, the second capacitance values and the average capacitance values of the reference positions corresponding to the sensing points under the touch pressure value may be used to calculate the touch position of the object. As such, the accuracy of positioning the touch position is enhanced.

Several exemplary embodiments accompanied with figures are described in detail below to further explain the invention.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EXEMPLARY EMBODIMENTS

The positioning method for a touch display panel described in the present embodiment may be implemented in form of software and executed in the correlative electronic devices (e.g., a computer), and hardware devices may position a touch position of an object on a display panel of the touch display panel. Nevertheless, people skilled in the art may execute or implement the positioning method for the touch display panel through employing firmware procedures or hardware structure according to some embodiments of the invention, so the disclosure is not limited to the software implementation. In order to make the invention more comprehensible, embodiments are described below as examples to demonstrate that the invention can actually be implemented.

Figure 1:
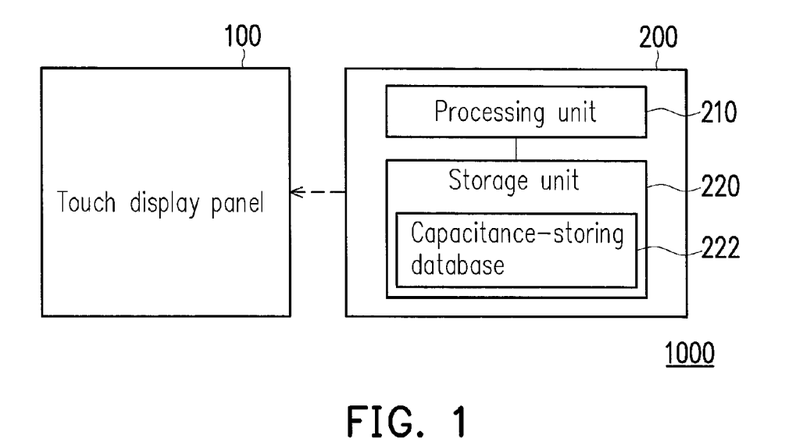
FIG. 1 is a block diagram illustrating a positioning system according to an embodiment of the invention.

FIG. 1 is a block diagram illustrating a positioning system according to an embodiment of the invention. With reference to FIG. 1, the positioning system 1000 includes a touch display panel 100 and an electronic device 200. In the present embodiment, the electronic device 200 serves to perform the positioning method the touch display panel. Particularly, the electronic device 200 is a personal computer, a notebook computer, or a personal digital assistant (PDA), for instance, which should not be construed as a limitation to the invention.

The electronic device 200 includes a processing unit 210 and a storage unit 220. The processing unit 210 is coupled to the storage unit 220. The storage unit 220 may store the required data and the software for implementing the positioning method described in the present embodiment. In an embodiment of the invention, the storage unit 220 may be configured in a cloud database, and the processing unit 210 may read data stored in the storage unit 220 through network or other communication mechanisms. To be specific, the storage unit 220 may be a database 222 storing capacitance values. The capacitance-storing database 222 includes data of capacitance values generated at each position on the touch panel when an object touches the display panel. The processing unit 210 is a central processing unit (CPU), for instance, and the processing unit 210 may obtain data in the storage unit 220, control the overall operation of the electronic device 200, and implement the positioning method described herein. For instance, the processing unit 210 may retrieve the data of capacitance values stored in the capacitance-storing database 222, so as to position a touch position of an object on the display panel.

Figure 2A:
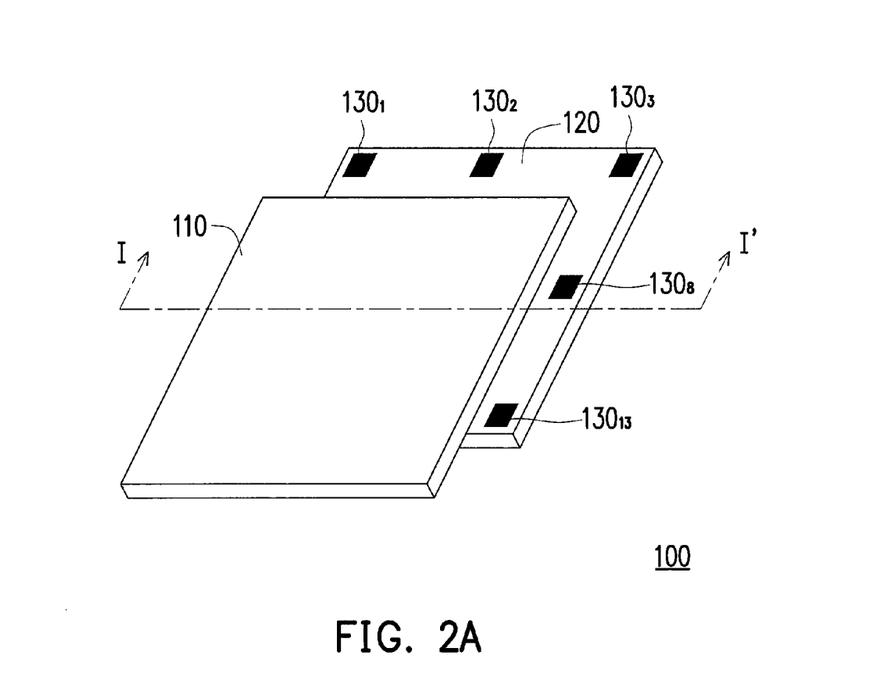
FIG. 2A is a schematic three-dimensional diagram illustrating a touch display panel according to an embodiment of the invention.
Figure 2B:
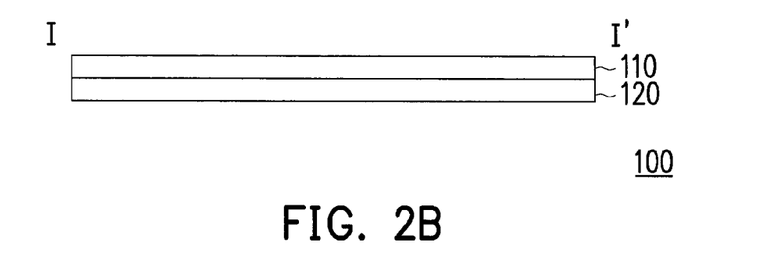
FIG. 2B is a schematic cross-sectional view illustrating the touch display panel depicted in FIG. 2A along a sectional line I-I'.

FIG. 2A is a schematic three-dimensional diagram illustrating a touch display panel according to an embodiment of the invention. FIG. 2B is a schematic cross-sectional view illustrating the touch display panel depicted in FIG. 2A along a sectional line IT. With reference to FIG. 2A and FIG. 2B, the touch display panel 100 includes a display panel 110 and a touch panel 120, and the display panel 110 is disposed on the touch panel 120. In the present embodiment, the display panel 110 is an electrophoretic display panel, which should not be construed as a limitation to the invention. The touch panel 120 is, for instance, a capacitive touch panel.

Figure 2C:
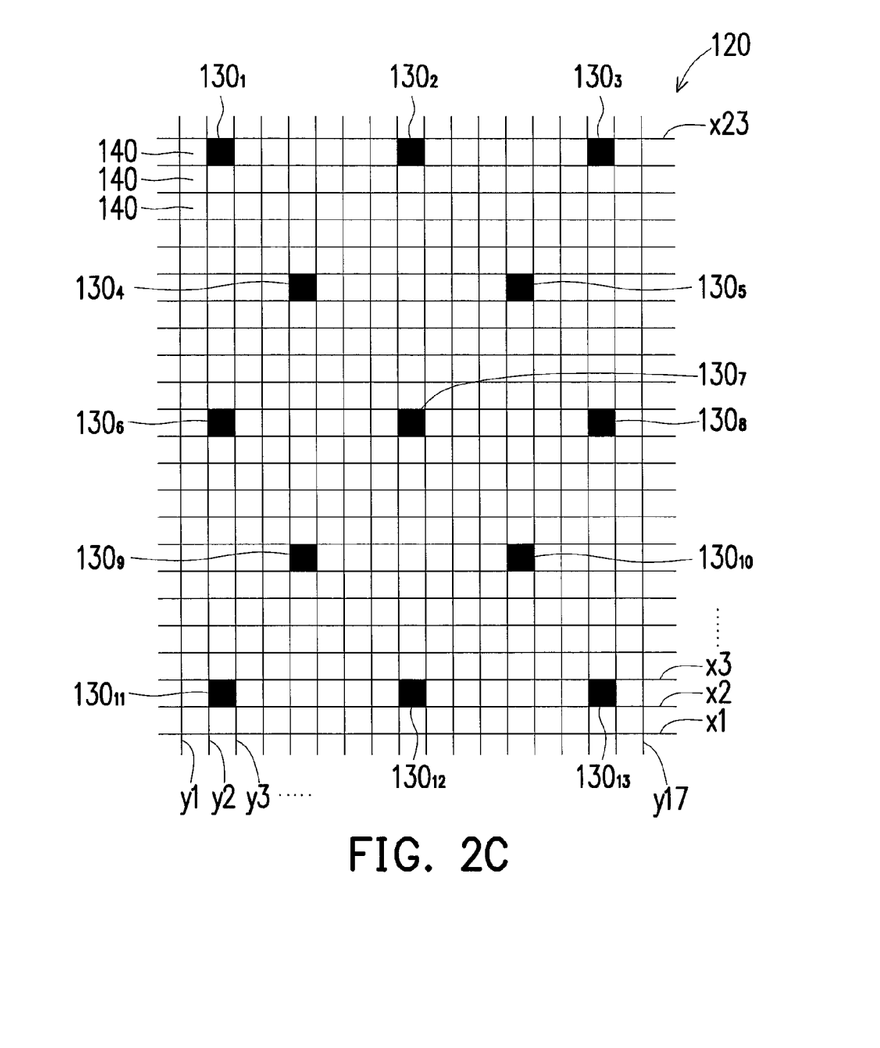
FIG. 2C is a schematic top diagram illustrating the touch panel depicted in FIG. 2A.

FIG. 2C is a schematic top diagram illustrating the touch panel depicted in FIG. 2A. With reference to FIG. 2C, the touch panel 120 may contain a plurality of reference positions 140 defined by a plurality of x-axes (e.g., x1~x23) and a plurality of y-axes (e.g., y1~y17), and the x-axes and the y-axes are alternately arranged in a matrix manner. The touch panel 120 has a plurality of sensing points (e.g., $130_1$~$130_{13}$) thereon, and the sensing points $130_1$~$130_{13}$ are distributed onto the reference positions 140. Note that the reference positions 140 defined by the x-axes x1~x23 and the y-axes y1~y17 alternately arranged in a 23×17 two-dimensional matrix manner are schematically depicted in FIG. 2C, and the number of the sensing points $130_1$~$130_{13}$ is 13, for instance. However, the number of the x-axes and the y-axes as well as the locations and the number of the sensing points are not limited in the present embodiment. Certainly, in other embodiments that are not shown in the drawings, the touch panel 120 may contain the reference positions collectively defined by x-axes, y-axes, and z-axes arranged in a three-dimensional matrix manner, which should not be construed as a limitation to the invention.

Figure 3:
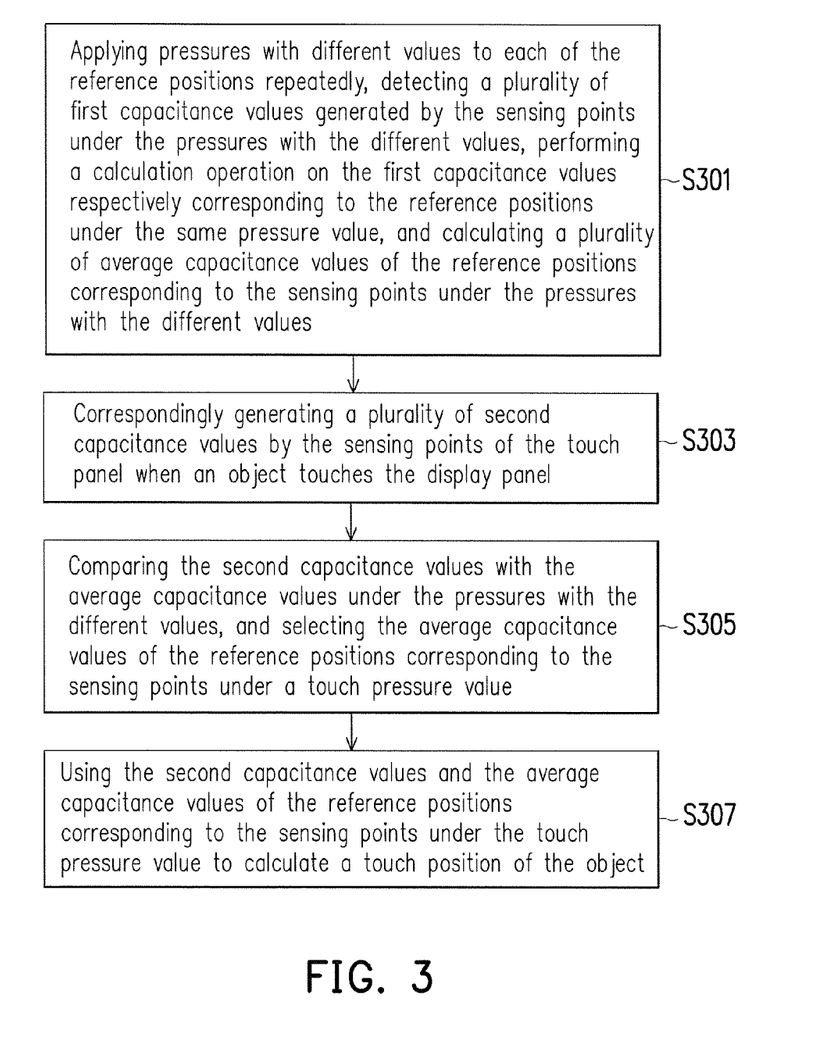
FIG. 3 is a schematic flow chart illustrating a positioning method for a touch display panel according to an embodiment of the invention.

FIG. 3 is a schematic flow chart illustrating a positioning method for a touch display panel according to an embodiment of the invention. With reference to FIG. 1, FIG. 2C, and FIG. 3, in step S301 described herein, pressures with different values are repeatedly applied to each of the reference positions 140; a plurality of first capacitance values generated by the sensing points $130_1$~$130_{13}$ under the pressures with the different values are detected; a calculation operation is performed on the first capacitance values respectively corresponding to the reference positions 140 under the same pressure value; a plurality of average capacitance values of the reference positions 140 corresponding to the sensing points $130_1$~$130_{13}$ under the pressures with the different values are calculated.

Particularly, one of the reference positions 140 is taken as an example. The exemplary reference position 140 repeatedly receives the pressures with different values (e.g., applying 10 g of pressures to the reference position 140 for ten times), and the pressures with the different values may be provided by a pressure machine (not shown) or any other apparatus that may exert pressures. After the sensing points $130_1$~$130_{13}$ sense the pressure on the reference position 140, the sensing points $130_1$~$130_{13}$ correspondingly generate the first capacitance values. Since the distance from each sensing point $130_1$ (or $130_2$~$130_{13}$) to the reference position 140 may be different, the first capacitance values correspondingly generated by the sensing points $130_1$~$130_{13}$ may be different as well. Namely, 13 different first capacitance values may be generated. The processing unit 210 then performs the calculation operation on the first capacitance value at each reference position 140 when the pressure with the same value is repeatedly applied, so as to calculate the average capacitance values of the reference positions 140 corresponding to the sensing points $130_1$~$130_{13}$ under the same pressure value.

Specifically, when a pressure P1 with a value is repeatedly applied to the reference positions 140, the sensing point $130_1$ may generate a plurality of first capacitance values $rC_{(1,P1)}$ respectively corresponding to the reference positions 140. Here, $C_{(1,P1)}$ represents the first capacitance value sensed by the sensing point $130_1$ corresponding to the reference position 140 receiving the pressure P1, and r represents the number of times the pressure P1 is applied to each single reference position 140 in the present embodiment. Similarly, the sensing point $130_2$ may generate a plurality of first capacitance values $rC_{(2,P1)}$ respectively corresponding to the reference positions 140. Here, $C_{(2,P1)}$ represents the first capacitance value sensed by the sensing point $130_2$ corresponding to the reference position 140 receiving the pressure P1, and r represents the number of times the pressure P1 is applied to each single reference position 140 in the present embodiment.

The processing unit 210 calculates respective averages of the first capacitance values $rC_{(1,P1)}$~$rC_{(13,P1)}$ sensed by the sensing points $130_1$~$130_{13}$ corresponding to the reference positions 140, so as to calculate average capacitance values table_$C_{(P1)}$ of the reference positions 140 corresponding to the sensing points $130_1$~$130_{13}$ when the reference positions 140 receive the pressure P1. Hence, in the present embodiment, if the pressures P1~Pm with different values are applied to the reference positions 140, the sensing points $130_1$~$130_{13}$ may correspondingly generate the average capacitance values table_$C_{(P1\sim Pm)}$ corresponding to the pressures P1~Pm with the different values. Here, the pressures P1~Pm with different values are respectively received by the reference positions 140, and m is the number of different pressures.

Figure 4:
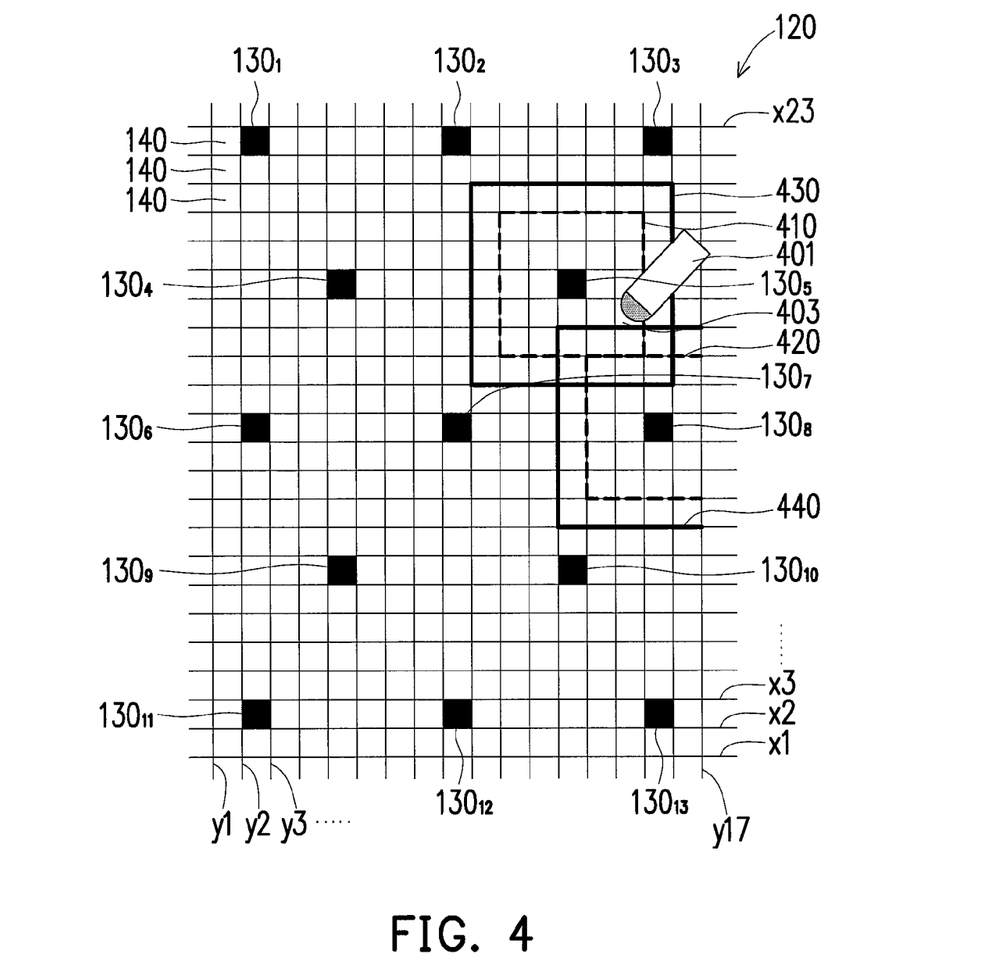
FIG. 4 is a schematic top diagram illustrating a positioning method for a touch display panel when an object touches the touch display panel according to an embodiment of the invention.

FIG. 4 is a schematic top diagram illustrating a positioning method for a touch display panel when an object touches the touch display panel according to an embodiment of the invention. To facilitate explanation of the invention, the display panel 110 is omitted from FIG. 4. With reference to FIG. 1, FIG. 3, and FIG. 4, in step S303, when an object 401 touches the display panel 110, a plurality of second capacitance values $C_1$~$C_{13}$ are correspondingly generated by the sensing points $130_1$~$130_{13}$ of the touch panel 120.

Thereby, the touch pressure generated by the object 401 touching the display panel 100 may be obtained. In step S305 shown in FIG. 3, the second capacitance values $C_1$~$C_{13}$ are compared with the average capacitance values table_$C_{(P1\sim Pm)}$ under the pressures with the different values, and the average capacitance values table_$C_{(Pt)}$ of the reference positions 140 corresponding to the sensing points $130_1$~$130_{13}$ under a touch pressure value Pt are selected.

With reference to FIG. 1 and FIG. 4, in the step of comparing the second capacitance values $C_1$~$C_{13}$ with the average capacitance values table_$C_{(P1\sim Pm)}$ under the pressures with the different values, the processing unit 210 may, according to the maximum capacitance value (e.g., the capacitance value generated by the sensing point $130_5$ in FIG. 4) among the second capacitance values $C_1$~$C_{13}$ correspondingly generated by the sensing points $130_1$~$130_{13}$ of the touch panel 120, select the average capacitance values table_$C_{(P1\sim Pm)}$ of the reference positions 140 in a first target region 410 around the sensing point $130_5$ having the maximum second capacitance value. For instance, in FIG. 4, the first target region 410 includes 25 reference positions 140. Certainly, in other embodiments not shown in the drawings, the number of the reference positions in the first target region 410 is not limited. The processing unit 210 then uses the second capacitance values $C_1$~$C_{13}$ (generated at the time the object 401 touches the display panel 110) and the average capacitance values table_$C_{(P1\sim Pm)}$ of the reference positions 140 in the first target region 410 under the pressures with the different values to calculate a third capacitance value M3 and a fourth capacitance value M4 respectively corresponding to two of the pressures with the different values. Here, the first target region 410 has 25 reference positions; therefore, 25 different capacitance values of the 25 reference positions may be obtained under each pressure value. For example, based on the following formula, the 25 different capacitance values of the 25 reference positions may be obtained with use of the following formula to calculate the capacitance value (i.e., M1p) of each single one of the 25 reference positions corresponding to the pressure value p. The third capacitance value M3 and the fourth capacitance value M4 are the minimum value and the second smallest value among the calculated capacitance values of the 25 reference positions obtained under the pressures with the different values.

Theoretically, the processing unit 210 may, according to the following formula, calculate the capacitance value M1p of each single one of the 25 reference positions corresponding to the pressure value p using the second capacitance values $C_1$~$C_{13}$ and the average capacitance values table_$C_{(P1\sim Pm)}$ of the reference positions 140 in the first target region 410 under the pressures with the different values:

$$M1p=(C_1\text{-table\_}C_{1p})^2+(C_2\text{-table\_}C_{2p})^2+(C_3\text{-table\_}C_{3p})^2+\ldots+(C_n\text{-table\_}C_{np})^2, \quad (1),$$

n≥1, wherein n is the number of the sensing points, $C_1$~$C_n$ are the second capacitance values of the sensing points corresponding to the reference positions, table_$C_{1p}$~table_$C_{np}$ are the average capacitance values of the reference positions corresponding to the sensing points under the pressure value p, and M1p is a capacitance value under the pressure value p.

To facilitate the calculation, the processing unit 210 described in the present embodiment may also calculate the capacitance value M1p of each single one of the 25 reference positions corresponding to the pressure value p using the second capacitance values $C_1$~$C_{13}$ and the average capacitance values table_$C_{(P1\sim Pm)}$ of the reference positions 140 in the first target region 410 under the pressures with the different values according to the following formula:

$$M1p=abs(C_1\text{-table\_}C_{1p})+abs(C_2\text{-table\_}C_{2p})+abs(C_3\text{-table\_}C_{3p})+\ldots+abs(C_n\text{-table\_}C_{np}), \quad (2),$$

wherein n is the number of the sensing points, $C_1$~$C_n$ are the second capacitance values of the sensing points corresponding to the reference positions, table_$C_{1p}$~table_$C_{np}$ are the average capacitance values of the reference positions corresponding to the sensing points under the pressure value p, and M1p is a capacitance value under the pressure value p.

To be specific, the average capacitance values table_$C_{(P1\sim Pm)}$ of the reference positions 140 corresponding to the sensing points $130_1$~$130_{13}$ are different under the pressures with the different values, and therefore the third and fourth capacitance values M3 and M4 under the pressures with the different values may be obtained by employing the formula (1) or the formula (2). Thereafter, the processing unit 210 may select the minimum value from the third and fourth capacitance values M3 and M4 to obtain a touch pressure value Pt. Namely, the minimum value of the third and fourth capacitance values M3 is the minimum value calculated using the second capacitance values and the average capacitance values table_$C_{(Pt)}$ of the reference positions 140 corresponding to the sensing points $C_1$~$C_{13}$ when the object 401 touches the display panel 110 to generate the touch pressure value Pt. Thereby, the processing unit 210 may obtain the average capacitance values table_$C_{(Pt)}$ of the reference positions 140 corresponding to the sensing points $C_1$~$C_{13}$ under the touch pressure value Pt.

To obtain the accurate touch pressure value Pt, after the average capacitance values table_$C_{(P1\sim Pm)}$ of the reference positions 140 in the first target region 410 are selected in the present embodiment, as shown in FIG. 4, the average capacitance values table_$C_{(P1\sim Pm)}$ of the reference positions 140 in a second target region 420 around one of the sensing points (e.g., the sensing point $130_8$) having the second largest second capacitance value among the second capacitance values $C_1$~$C_{13}$ may be selected. Here, the second target region 420 shown in FIG. 4 includes 20 reference positions 140, and the second target region 420 and the first target region 410 are partially overlapped. Certainly, in other embodiments of the invention, the number of the reference positions in the second target region 420 is not limited. The processing unit 210 may use the second capacitance values $C_1$~$C_{13}$ (generated at the time the object 401 touches the display panel 110) and the average capacitance values table_$C_{(P1\sim Pm)}$ of the reference positions 140 in the second target region 420 under the pressures with the different values to calculate a fifth capacitance value M5 and a sixth capacitance value M6 respectively corresponding to two of the pressures with the different values. Here, the second target region 420 has 20 reference positions; therefore, 20 different capacitance values of the 20 reference positions may be obtained under each pressure value. For example, based on the above-mentioned formula, the 20 different capacitance values of the 20 reference positions may be obtained with use of the above-mentioned formula to calculate the capacitance value (i.e., M1p) of each single one of the 20 reference positions under the pressure value p. The fifth capacitance value M5 and the sixth capacitance value M6 are the minimum value and the second smallest value among the calculated capacitance values of the 20 reference positions obtained under the pressures with the different values. Likewise, the processing unit 210 may obtain the fifth capacitance value M5 and the sixth capacitance value M6 corresponding to the pressures with different values according to the formula (1) or the formula (2). Thereby, the processing unit 210 may select the minimum value from the third, fourth, fifth, and sixth capacitance values M3, M4, M5, and M6 to obtain the average capacitance values table_$C_{(Pt)}$ of the reference positions 140 corresponding to the sensing points $C_1 \sim C_{13}$ under the touch pressure value Pt.

According to the present embodiment, the number of the target regions is not limited, i.e., more target regions may be selected in other embodiments of the invention. In this case, note that the processing unit 210 may, according to the formula (1) or the formula (2), obtain the capacitance values of the reference positions in more target regions under the pressures with different values. Thereafter, the processing unit 210 may select the minimum capacitance value from more capacitance values, such that the obtained touch pressure value is more accurate, and that the average capacitance values table_$C_{(Pt)}$ of the reference positions 140 corresponding to the sensing points $C_1 \sim C_{13}$ under the touch pressure value Pt may be obtained.

With reference to FIG. 1, FIG. 3, and FIG. 4B, after the touch pressure value Pt is obtained, in step S307, the second capacitance values $C_1 \sim C_{13}$ and the average capacitance values table_$C_{(Pt)}$ of the reference positions 140 corresponding to the sensing points 130$_1$~130$_{13}$ under the touch pressure value Pt are used to calculate a touch position 403 of the object 401. In particular, the processing unit 210 may select the average capacitance values table_$C_{(Pt)}$ of the reference positions 140 in a third target region 430 around one of the sensing points (e.g., the sensing point 130$_5$) having the maximum second capacitance value among the second capacitance values $C_1 \sim C_{13}$ under the touch pressure value Pt. According to the present embodiment, the number of the reference positions 140 in the third target region 430 is greater than the number of the reference positions 140 in the first target region 410; in another embodiment not shown in the drawings, the number of the reference positions 140 in the third target region 430 may be equal to the number of the reference positions 140 in the first target region 410, which should not be construed as a limitation to the invention. The processing unit 210 then uses the second capacitance values $C_1 \sim C_{13}$ (generated at the time the object 401 touches the display panel 110 to generate the touch pressure value Pt) and the average capacitance values table_$C_{(P1\sim Pm)}$ of the reference positions 140 in the third target region 430 under the touch pressure value Pt to calculate a third capacitance value M3' and a fourth capacitance value M4' respectively corresponding to two different values. The third capacitance value M3' and the fourth capacitance value M4' are the minimum value and the second smallest value among the calculated capacitance values of the reference positions 140 in the third target region 430.

Theoretically, the processing unit 210 may, according to the following formula, calculate a capacitance value M2 using the second capacitance values $C_1 \sim C_{13}$ and the average capacitance values table_$C_{(P1\sim Pm)}$ of the reference positions 140 in the third target region 430 under the touch pressure value Pt:

$$M2 = \mathrm{sqrt}((C_1\text{-table}\_C_1)^2 + (C_2\text{-table}\_C_2)^2 + (C_3\text{-table}\_C_3)^2 + \ldots + (C_n\text{-table}\_C_n)^2), \quad (3)$$

wherein n is the number of the sensing points, $C_1 \sim C_n$ are the second capacitance values of the sensing points corresponding to the reference positions, table_$C_1$~table_$C_n$ are the average capacitance values of the sensing points corresponding to the reference positions, and M2 is a capacitance value under the touch pressure value.

To facilitate the calculation, the processing unit 210 described in the present embodiment may also calculate the capacitance value M2 using the second capacitance values $C_1 \sim C_{13}$ and the average capacitance values table_$C_{(Pt)}$ of the reference positions 140 in the third target region 430 under the touch pressure value Pt according to the following formula:

$$M2 = abs(C_1\text{-table}\_C_1) + abs(C_2\text{-table}\_C_2) + abs(C_3\text{-table}\_C_3) + \ldots + abs(C_n\text{-table}\_C_n), \quad (4)$$

$n \geq 1$, wherein n is the number of the sensing points, $C_1 \sim C_n$ are the second capacitance values of the sensing points corresponding to the reference positions, table_$C_1$~table_$C_n$ are the average capacitance values of the sensing points corresponding to the reference positions, and M2 is a capacitance value under the touch pressure value.

That is, in the present embodiment, the third capacitance value M3' and the fourth capacitance value M4' corresponding to the touch pressure value Pt may be obtained according to the formula (3) or the formula (4). The processing unit 210 may then select the minimum value from the third capacitance value M3' and the fourth capacitance value M4'. Through the minimum capacitance value, the processing unit 210 may obtain the touch position 403 of the object 401. As such, the touch position 403 of the object 401 on the touch panel 110 may be acquired.

To obtain the accurate touch position of the object 401, after the average capacitance values table_$C_{(Pt)}$ of the reference positions 140 corresponding to the sensing points 130$_1$~130$_{13}$ in the third target region 430 are selected under the touch pressure value Pt in the present embodiment, as shown in FIG. 4, the average capacitance values table_$C_{(Pt)}$ of the reference positions 140 corresponding to the sensing points 130$_1$~130$_{13}$ in a fourth target region 440 around one of the sensing points (e.g., the sensing point 130$_8$) having the second largest second capacitance value among the second capacitance values $C_1 \sim C_{13}$ may be selected. According to the present embodiment, the number of the reference positions 140 in the fourth target region 440 is greater than the number of the reference positions 140 in the second target region 420; in another embodiment not shown in the drawings, the number of the reference positions 140 in the fourth target region 440 may be equal to the number of the reference positions 140 in the second target region 420. The processing unit 210 then uses the second capacitance values $C_1 \sim C_{13}$ (generated at the time the object 401 touches the display panel 110 to generate the touch pressure value Pt) and the average capacitance values table_$C_{(Pt)}$ of the reference positions 140 in the fourth target region 440 under the touch pressure value Pt to calculate a fifth capacitance value M5' and a sixth capacitance value M6' respectively corresponding to two different values. The fifth capacitance value M5' and the sixth capacitance value M6' are the minimum value and the second smallest value among the obtained capacitance values in the fourth target region 440.

Likewise, the processing unit 210 may obtain the fifth capacitance value M5' and the sixth capacitance value M6' corresponding to the touch pressure value Pt according to the formula (3) or the formula (4). Thereby, the processing unit 210 may select the minimum value from the third, fourth, fifth, and sixth capacitance values M3', M4', M5', and M6' to obtain the touch position 403 of the object 401.

Undoubtedly, the number of the target regions is not limited in the present embodiment, i.e., more target regions may be selected in other embodiments of the invention. If more target regions are selected, note that the processing unit 210 may, according to the formula (3) or the formula (4), obtain more capacitance values. Hence, the processing unit 210 may select the minimum value from more calculated capacitance values, so as to obtain the accurate touch position.

Besides, the processing unit 210 may apply different weights respectively to the third, fourth, fifth, and sixth capacitance values M3', M4', M5', and M6. For instance, a greater weight (e.g., 5 points) may be applied to the relatively influential capacitance value among the third, fourth, fifth, and sixth capacitance values M3', M4', M5', and M6', and a smaller weight (e.g., 1 point) may be applied to the less influential capacitance value among the third, fourth, fifth, and sixth capacitance values M3', M4', M5', and 6'. Based on the weights respectively applied to the capacitance values, the processing unit 210 is able to obtain the reference value with the greatest weight, and thereby the processing unit 210 may obtain the touch position 403 of the object 401.

According to the present embodiment, the display panel 110 is disposed above the touch panel 120; therefore, when the object 401 touches the touch display panel 100, a touch signal can only be transmitted to the touch panel 120 through the display panel 110. During signal transmission, degradation of the signal may prevent the touch panel 120 from obtaining the accurate touch position. To resolve said issue, the average capacitance values table_$C_{(P1 \sim Pm)}$ of the reference positions 140 corresponding to the sensing points $130_1 \sim 130_{13}$ under the pressures with the different values are calculated according to the positioning method for the touch display panel 100 described in the present embodiment. Hence, when the object 401 touches the display panel 110 to enable the sensing points $130_1 \sim 130_{13}$ of the underlying touch panel 120 to correspondingly generate the second capacitance values $C_1 \sim C_{13}$, the average capacitance values table_$C_{(P1 \sim Pm)}$ under the pressures with the different values may be compared with the second capacitance values $C_1 \sim C_{13}$, so as to learn the average capacitance values table_$C_{(Pt)}$ of the reference positions 140 corresponding to the sensing points $130_1 \sim 130_{13}$ when the object 401 touches the display panel 110 to generate the touch pressure value Pt. The second capacitance values $C_1 \sim C_{13}$ and the average capacitance values table_$C_{(Pt)}$ of the reference positions 140 corresponding to the sensing points $130_1 \sim 130_{13}$ under the touch pressure value Pt are then calculated, so as to obtain the touch position 403 of the object 401. Through the comparison with and the calculation of the average capacitance values table_$C_{(P1 \sim Pm)}$ of the reference positions 140 corresponding to the sensing points $130_1 \sim 130_{13}$ under the pressures with the different values, the accuracy of positioning the touch position may be further enhanced.

To sum up, the average capacitance values of the reference positions corresponding to the sensing points under the pressures with the different values are measured in an embodiment of the invention. Therefore, when the object touches the display panel to enable the sensing points of the touch panel below the display panel to correspondingly generate the second capacitance values, the second capacitance values may be compared with the average capacitance values under the pressures with the different values, so as to obtain the average capacitance values of the reference positions corresponding to the sensing points at the time the object touches the display panel to generate a touch pressure value. Thereafter, the second capacitance values and the average capacitance values of the reference positions corresponding to the sensing points under the touch pressure value may be used to calculate the touch position of the object. As such, the accuracy of positioning the touch position is enhanced.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A positioning method for a touch display panel comprising a display panel and a touch panel, the display panel being disposed on the touch panel, wherein the touch panel has a plurality of sensing points thereon and contains a plurality of reference positions defined by a plurality of x-axes and a plurality of y-axes, the x-axes and the y-axes being alternately arranged in a matrix manner, the sensing points being distributed on the reference positions, the positioning method comprising:

applying pressures with different values to each of the reference positions repeatedly, detecting a plurality of first capacitance values generated by the sensing points under the pressures with the different values, performing a calculation operation on the first capacitance values respectively corresponding to the reference positions under the same pressure value, and calculating a plurality of average capacitance values of the reference positions corresponding to the sensing points under the pressures with the different values;

when an object touches the display panel, correspondingly generating a plurality of second capacitance values by the sensing points of the touch panel;

comparing the second capacitance values with the average capacitance values under the pressures with the different values, and selecting the average capacitance values of the reference positions corresponding to the sensing points under a touch pressure value of the pressures with the different values; and using the second capacitance values and the average capacitance values of the reference positions corresponding to the sensing points under the touch pressure value to calculate a touch position of the object, wherein the step of comparing the second capacitance values with the average capacitance values under the pressures with the different values comprises:

selecting the average capacitance values of the reference positions in a first target region around one of the sensing points having a maximum second capacitance value of the second capacitance values;

using a formula comprising parameters of the second capacitance values of the touch position and the average capacitance values of the reference positions in the first target region under the pressures with the different values to at least calculate a third capacitance value and a fourth capacitance value of the first target region respectively corresponding to two of the pressures with the different values; and selecting a minimum value from the third and fourth capacitance values of the first target region to obtain the average capacitance values of the reference positions corresponding to the sensing points under the touch pressure value.

2. The positioning method for the touch display panel as recited in claim 1, further comprising:

after selecting the average capacitance values of the reference positions in the first target region under the pressures with the different values, selecting the average capacitance values of the reference positions in a second target region around one of the sensing points having a second largest second capacitance value of the second capacitance values under the pressures with the different values, wherein the second target region and the first target region are partially overlapped;

using a formula comprising parameters of the second capacitance values of the touch position and the average capacitance values of the reference positions in the second target region under the pressures with the different values to at least calculate a fifth capacitance value and a sixth capacitance value respectively corresponding to two of the pressures with the different values; and selecting a minimum value from the third, fourth, fifth, and sixth capacitance values to obtain the average capacitance values of the reference positions corresponding to the sensing points under the touch pressure value.

3. The positioning method for the touch display panel as recited in claim 2, wherein the formula comprising the parameters of the second capacitance values of the touch position and the average capacitance values of the reference positions in the first target region or the second target region under the pressures with the different values is:

$$M1=(C_1\text{-table}\_C_1)^2+(C_2\text{-table}\_C_2)^2+(C_3\text{-table}\_C_3)^2+\ldots+(C_n\text{-table}\_C_n)^2,$$

$n \geq 1$, wherein n is the number of the sensing points, $C_1 \sim C_n$ are the second capacitance values of the sensing points corresponding to the reference positions, $\text{table}\_C_1 \sim \text{table}\_C_n$ are the average capacitance values of the reference positions corresponding to the sensing points, and M1 is a capacitance value corresponding to each of the pressures with the different values.

4. The positioning method for the touch display panel as recited in claim 2, wherein the formula comprising the parameters of the second capacitance values of the touch position and the average capacitance values of the reference positions in the first target region or the second target region under the pressures with the different values is:

$$M1=abs(C_1\text{-table}\_C_1)+abs(C_2\text{-table}\_C_2)+abs(C_3\text{-table}\_C_3)+\ldots+abs(C_n\text{-table}\_C_n),$$

$n \geq 1$, wherein n is the number of the sensing points, $C_1 \sim C_n$ are the second capacitance values of the sensing points corresponding to the reference positions, $\text{table}\_C_1 \sim \text{table}\_C_n$ are the average capacitance values of the reference positions corresponding to the sensing points, and M1 is a capacitance value corresponding to each of the pressures with the different values.

5. The positioning method for the touch display panel as recited in claim 1, wherein the step of using the second capacitance values and the average capacitance values of the reference positions corresponding to the sensing points under the touch pressure value to calculate the touch position of the object comprises:

selecting the average capacitance values of the reference positions corresponding to the sensing points in a third target region around one of the sensing points having a maximum second capacitance value of the second capacitance values under the touch pressure value;

using a formula comprising parameters of the second capacitance values of the touch position and the average capacitance values of the reference positions in the third target region under the touch pressure value to at least calculate a third capacitance value and a fourth capacitance value of the third target region respectively corresponding to two different values; and selecting a minimum value from the third and fourth capacitance values of the third target region to obtain the touch position of the object.

6. The positioning method for the touch display panel as recited in claim 5, further comprising:

after selecting the average capacitance values of the reference positions corresponding to the sensing points in the third target region under the touch pressure value, selecting the average capacitance values of the reference positions corresponding to the sensing points in a fourth target region around one of the sensing points having a second largest second capacitance value of the second capacitance values under the touch pressure value, wherein the fourth target region and the third target region are partially overlapped;

using a formula comprising parameters of the second capacitance values of the touch position and the average capacitance values of the reference positions in the fourth target region under the touch pressure value to at least calculate a fifth capacitance value and a sixth capacitance value respectively corresponding to two different values; and selecting a minimum value from the third, fourth, fifth, and sixth capacitance values to obtain the touch position of the object.

7. The positioning method for the touch display panel as recited in claim 6, wherein the formula comprising the parameters of the second capacitance values of the touch position and the average capacitance values of the reference positions in the third target region or the fourth target region under the touch pressure value is:

$$M2=\text{sqrt}((C_1\text{-table}\_C_1)^2+(C_2\text{-table}\_C_2)^2+(C_3\text{-table}\_C_3)^2+\ldots+(C_n\text{-table}\_C_n)^2),$$

$n \geq 1$, wherein n is the number of the sensing points, $C_1 \sim C_n$ are the second capacitance values of the sensing points corresponding to the reference positions, $\text{table}\_C_1 \sim \text{table}\_C_n$ are the average capacitance values of the reference positions corresponding to the sensing points, and M2 is a capacitance value under the touch pressure value.

8. The positioning method for the touch display panel as recited in claim 6, wherein the formula comprising the parameters of the second capacitance values of the touch position and the average capacitance values of the reference positions in the third target region or the fourth target region under the touch pressure value is:

$$M2=abs(C_1\text{-table}\_C_1)+abs(C_2\text{-table}\_C_2)+abs(C_3\text{-table}\_C_3)+\ldots+abs(C_n\text{-table}\_C_n),$$

$n \geq 1$, wherein n is the number of the sensing points, $C_1 \sim C_n$ are the second capacitance values of the sensing points corresponding to the reference positions, $table\_C_1 \sim table\_C_n$ are the average capacitance values of the reference positions corresponding to the sensing points, and M2 is a capacitance value under the touch pressure value.

9. The positioning method for the touch display panel as recited in claim 6, further comprising:
  applying different weights respectively to the third, fourth, fifth, and sixth capacitance values.

* * * * *